(12) United States Patent
Mueller et al.

(10) Patent No.: US 8,961,621 B2
(45) Date of Patent: Feb. 24, 2015

(54) AZO DYES

(71) Applicant: Huntsman International LLC, The Woodlands, TX (US)

(72) Inventors: Alexander Mueller, Weil am Rhein (DE); Rainer Hildebrand, Lorrach (DE); Siro Dalle-Nogare, Basel (CH)

(73) Assignee: Huntsman International LLC, The Woodlands, TX (US)

( * ) Notice: Subject to any disclaimer, the term of this patent is extended or adjusted under 35 U.S.C. 154(b) by 0 days.

(21) Appl. No.: 14/362,931

(22) PCT Filed: Nov. 26, 2012

(86) PCT No.: PCT/EP2012/073572
§ 371 (c)(1),
(2) Date: Jun. 5, 2014

(87) PCT Pub. No.: WO2013/087400
PCT Pub. Date: Jun. 20, 2013

(65) Prior Publication Data
US 2014/0304926 A1 Oct. 16, 2014

(30) Foreign Application Priority Data
Dec. 14, 2011 (EP) .................................... 11193426

(51) Int. Cl.
*D06P 1/02* (2006.01)
*D06P 1/06* (2006.01)
*C09B 33/06* (2006.01)

(52) U.S. Cl.
CPC .. *D06P 1/06* (2013.01); *C09B 33/06* (2013.01)
USPC .................................................. 8/466; 8/641

(58) Field of Classification Search
USPC .................................................... 8/641, 466
See application file for complete search history.

(56) References Cited

U.S. PATENT DOCUMENTS 2,080,191 A  5/1937  Straub et al.

FOREIGN PATENT DOCUMENTS

| DE | 10 2011 100935 | 12/2011 | |
| EP | 0 091 020 | 10/1983 | |
| EP | 0140252 | * 12/1984 | ............. C09B 45/24 |
| EP | 0 140 252 | 5/1985 | |
| GB | 1349168 | 3/1974 | |
| WO | 03/033599 | 4/2003 | |

OTHER PUBLICATIONS

STIC Search Report dated Aug. 15, 2014.*

* cited by examiner

*Primary Examiner* — Eisa Elhilo

(57) ABSTRACT

The present invention relates to dyes of formula (1), wherein each of the residues $D_1$ and $D_2$ represents a radical of formula (2), wherein $Ar_1$ represents the tetravalent radical of a carbocyclic or heterocyclic aromatic compound, $R_1$, $R_2$ and $R_3$ are each independently of the other hydrogen, $C_1$-$C_{12}$alkyl, $C_1$-$C_{12}$alkoxy, halogen, —OH, —CN, —NO$_2$, —CF$_3$, —SO$_3$H, —NHCOR$_4$, —COOR$_5$, —CONR$_6$R$_7$, —SO$_2$NR$_8$R$_9$, —NR$_{10}$SO$_2$R$_{11}$, —SO$_2$R$_{13}$— or —ZCH$_2$CH$_2$Q, wherein Z is —O—, —SO$_2$—, —NR$_{12}$—, —CONH— or —NHCO—, Q represents —OH, $C_1$-$C_{12}$alkyl, —SO$_2$R$_{13}$—, —NHR$_{14}$—, —OCH$_2$CH$_2$OH, —SO$_2$CH$_2$CH$_2$OH or —NHCH$_2$CH$_2$OH, $R_4$ is $C_1$-$C_{12}$alkyl, $R_5$, $R_6$, $R_7$, $R_8$, $R_9$, $R_{10}$, $R_{12}$, $R_{13}$ and $R_{14}$ are each independently of the others hydrogen or $C_1$-$C_{12}$alkyl, and $R_{11}$ is $C_1$-$C_{12}$2alkyl, with the proviso that at least one of the residues $D_1$ and $D_2$ is a radical of formula (2) wherein $R_3$ is —COOR$_5$, —SO$_2$NR$_8$R$_9$, —SO$_2$R$_{13}$— or —ZCH$_2$CH$_2$Q, dichromatic and trichromatic mixtures containing these dyes and the use of these dyes for dyeing or printing hydroxyl group-containing or nitrogen-containing fibre materials.

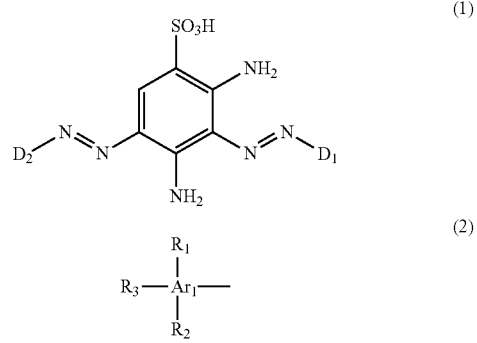

10 Claims, No Drawings

AZO DYES

CROSS REFERENCE TO RELATED APPLICATIONS

This application is the National Phase of International Application PCT/EP2012/073572 filed Nov. 26, 2012 which designated the U.S. and which claims priority to European Pat, App. No. 11193426.1 filed Dec. 14, 2011. The noted applications are incorporated herein by reference.

The present invention relates to novel azo dyes, to a process for their preparation and to their use in the dyeing or printing of textile fibre materials.

Dyeing nowadays requires dyes that have sufficient substantivity and at the same time have good ease of washing off of unfixed dye. They should also have a good colour yield and high reactivity, the objective being to provide especially dyeings having high degrees of fixation.

Dichromatic and trichromatic dye mixtures are frequently used in dyeing or printing processes for natural or synthetic polyamide (PA) fibres.

Dichromatic and trichromatic dyeing or printing requires, in particular, good compatibility of the dyestuffs employed in the process. Furthermore, the dyes should distinguish by level colour build-up, good exhaustion properties, good constancy of shade even at different concentrations and good fastness properties while being cost efficient.

There is a demand especially for yellow dyes which satisfy these requirements and can be combined with numerous red and blue dyes to provide feasible dichromatic or trichromatic mixtures for dyeing or printing of polyamide fibres.

It has been found that the problem posed is largely solved by the novel dyes defined herein-below, especially when the dyes are used for dyeing synthetic polyamide fibre materials.

The present invention therefore relates to a dye of formula

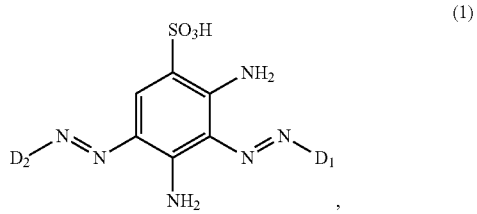

(1)

wherein each of the residues $D_1$ and $D_2$ represents a radical of formula

(2)

wherein
$Ar_1$ represents the tetravalent radical of a carbocylic or heterocyclic aromatic compound,
$R_1$, $R_2$ and $R_3$ are each independently of the other hydrogen, $C_1$-$C_{12}$alkyl, $C_1$-$C_{12}$alkoxy, halogen, —OH, —CN, —$NO_2$, —$CF_3$, —$SO_3H$, —$NHCOR_4$, —$COOR_5$, —$CONR_6R_7$, —$SO_2NR_8R_9$, —$NR_{10}SO_2R_{11}$ or —$ZCH_2CH_2Q$, wherein Z is —O—, —$SO_2$—, —$NR_{12}$—, —CONH— or —NHCO—, Q represents —OH, $C_1$-$C_{12}$alkyl, —$SO_2R_{13}$—, —$NHR_{14}$—, —$OCH_2CH_2OH$, —$SO_2CH_2CH_2OH$ or —$NHCH_2CH_2OH$, $R_4$ is $C_1$-$C_{12}$alkyl,
$R_5$, $R_6$, $R_7$, $R_8$, $R_9$, $R_{10}$, $R_{12}$, $R_{13}$ and $R_{14}$ are each independently of the others hydrogen or $C_1$-$C_{12}$alkyl, and
$R_{11}$ is $C_1$-$C_{12}$alkyl.

The residues $D_1$ and $D_2$ may be identical or may represent different radicals of formula (2).

When any of the radicals $R_1$-$R_{14}$ is $C_1$-$C_{12}$alkyl, that radical or those radicals may be straight-chain or branched. Examples of $C_1$-$C_{12}$alkyl groups are methyl, ethyl, n-propyl, isopropyl, n-butyl, isobutyl, sec-butyl, tert-butyl, n-pentyl, neopentyl, n-hexyl, n-heptyl, n-octyl, isooctyl, n-decyl and n-dodecyl.

Examples of $C_1$-$C_{12}$alkoxy groups as radicals $R_1$-$R_3$ are methoxy, ethoxy, n-propoxy, isopropoxy, n-butoxy, isobutoxy, sec-butoxy, tert-butoxy, n-pentyloxy, neopentyloxy, n-hexyloxy, n-heptyloxy, n-octyloxy, isooctyloxy, n-decyloxy, n-undecyloxy and n-dodecyloxy.

Suitable halogen substituents are fluorine, chlorine, bromine and iodine, in particular chlorine and bromine The tetravalent radical $Ar_1$ can be derived from a carbocylic aromatic compound having 6 to 24 carbon atoms, like benzene, naphthalene, anthracene or phenanthrene.

Moreover, the tetravalent radical $Ar_1$ can be derived from a heterocyclic aromatic compound having preferably 4 or 5 carbon atoms and one or two hetero atoms from the group O, S and N, like for example pyrrole, furane, thiophene, oxazole, thiazole, pyridine, pyrazine, pyrimidine, pyridazine, indole, purine or quinone.

Preferably, $Ar_1$ represents the tetravalent radical of benzene.

Preferred dyes of formula (1) contain a radical of formula (2), wherein $R_1$ and $R_2$ are each independently of the other hydrogen, methyl or methoxy.

Further preferred dyes of formula (1) contain a radical of formula (2), wherein $R_3$ is —$COOCH_3$ or —$COOC_2H_5$.

Further preference is given to dyes of formula (1) containing a radical of formula (2), wherein $R_3$ is —$ZCH_2CH_2Q$, wherein Z and Q are as defined above.

Particularly preferred are dyes of formula (1), wherein one of the residues $D_1$ and $D_2$ represents a radical of formula (2) wherein $R_3$ is —$ZCH_2CH_2Q$, wherein Z and Q are as defined above, and the other is a radical of formula (2) wherein $R_3$ is —$COOCH_3$ or —$COOC_2H_5$.

Suitable radicals of formula (2) are, for example, the radicals of formulae (2a)-(2z)

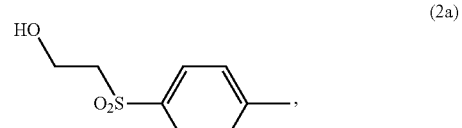

(2a)

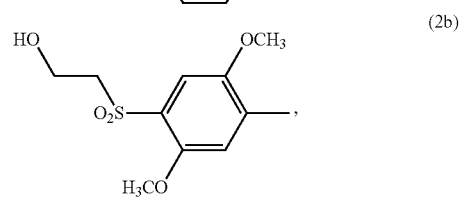

(2b)

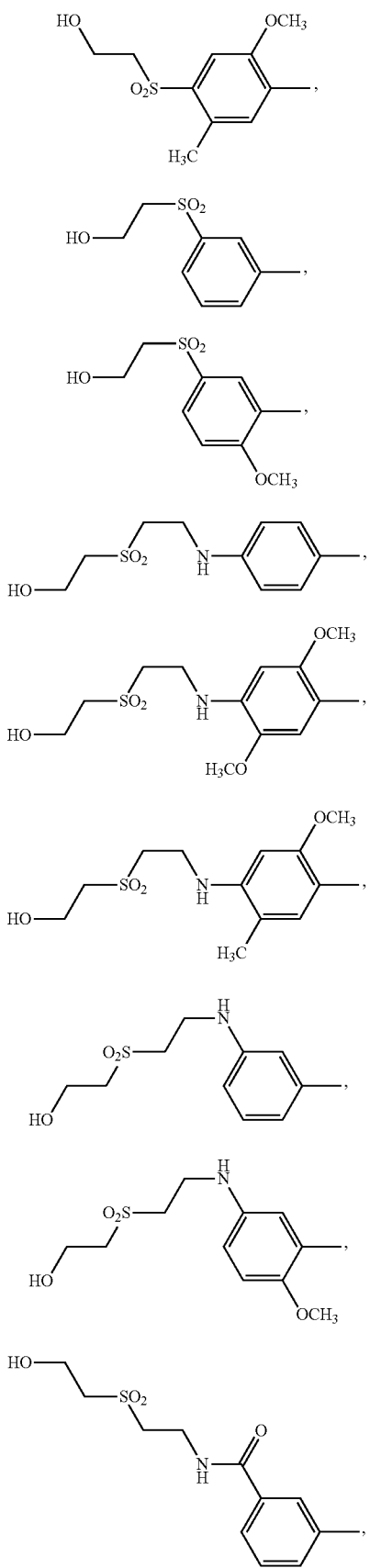
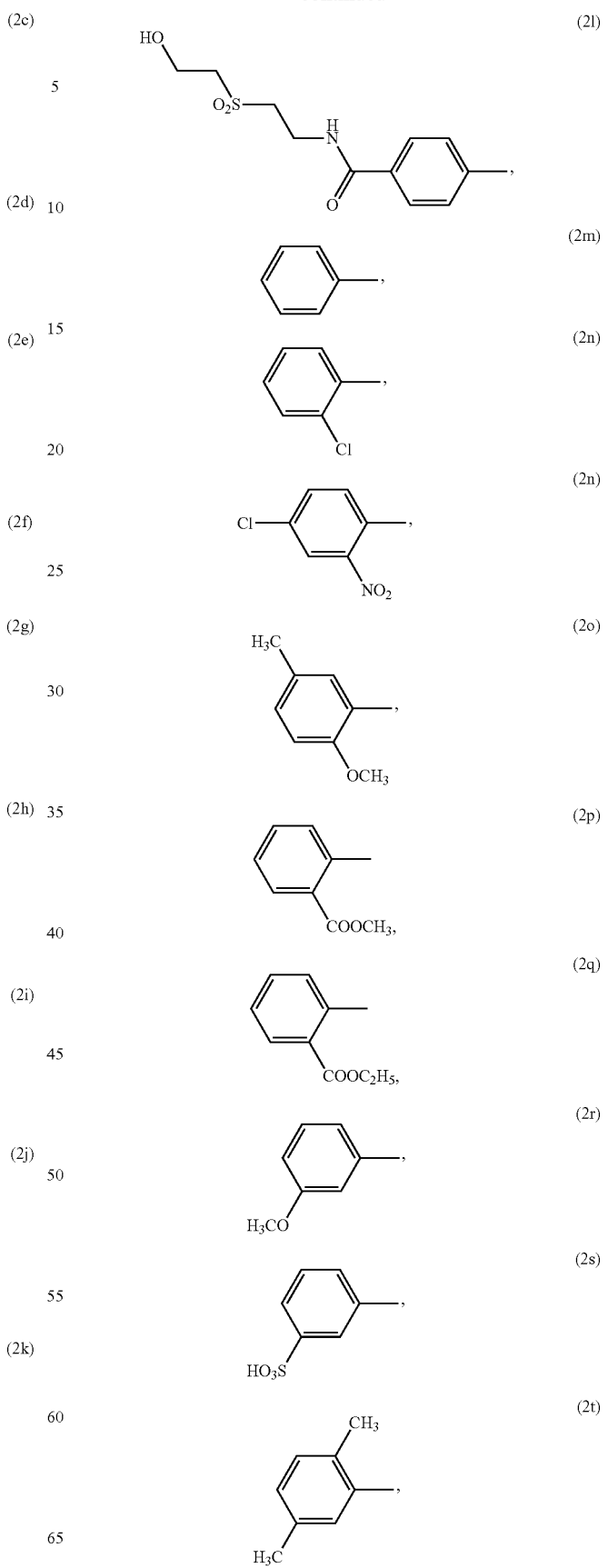

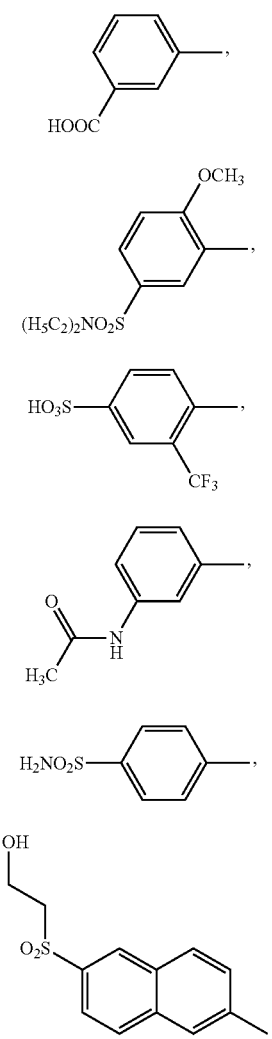

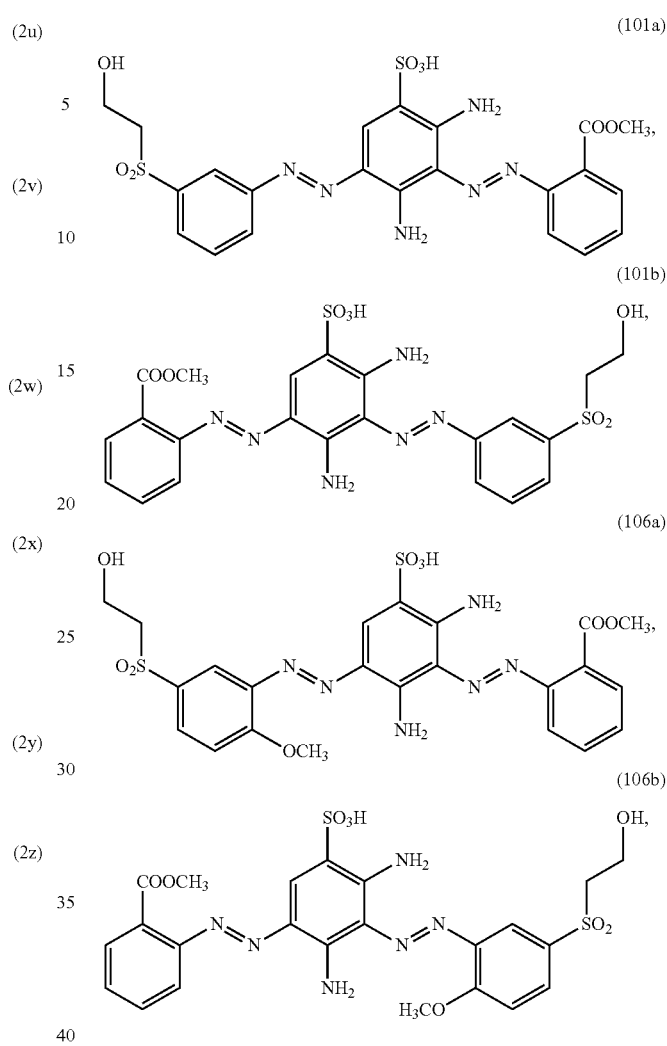

Preferred radicals of formula (2) are the radicas of formulae (2a), (2b), (2c), (2d) and (2e).

Further preferred radicals of formula (2) are the radicals of formulae (2p) and (2q)

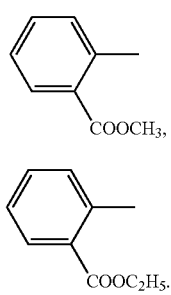

Special preference is given to the dyes of formulae (101a), (101b), (106a) and (106b)

In one of its aspects, the invention also relates to a process for the preparation of a dye of formula (1) as defined above, wherein in a first step a diazo component of formula $D_1$-$NH_2$, wherein $D_1$ is as defined above, is diazotised and coupled to 2,4-diaminobenzenesulfonic acid and the thus obtained intermediate is reacted in a second step with a diazonium salt prepared by diazotation of a diazo component of formula $D_2$-$NH_2$, wherein $D_2$ is as defined above.

The amino compounds $D_1$-$NH_2$ and $D_2$-$NH_2$ are known and some are commercially available.

The diazotisation reactions are carried out in a manner known per se, for example with sodium nitrite in an acidic, e.g. hydrochloric-acid-containing or sulfuric-acid-containing, aqueous medium. The diazotisation may, however, also be carried out using other diazotisation agents, for example using nitrosylsulfuric acid. In the diazotisation, an additional acid may be present in the reaction medium, for example phosphoric acid, sulfuric acid, acetic acid, propionic acid or hydrochloric acid or a mixture of such acids, for example a mixture of propionic acid and acetic acid. The diazotisation is advantageously carried out at temperatures of from −10 to 30° C., for example from 0° C. to room temperature.

The coupling of the diazotised amines $D_1$-$NH_2$ and $D_2$-$NH_2$ to the coupling component is likewise effected in known manner, for example in an acidic, aqueous or aqueous-organic medium, advantageously at temperatures of from −10 to 30° C., especially below 15° C. Examples of acids used are hydrochloric acid, acetic acid, propionic acid, sulfuric acid and phosphoric acid.

The dyes of the formula (1) can conveniently be used in combination with further yellow or orange acid dyes like, for example, C.I. Acid Yellow 17, C.I. Acid Yellow 199, C.I. Acid Yellow 219, C.I. Acid Yellow 230, C.I. Acid Yellow 246, C.I. Acid Yellow 256, C.I. Acid Orange 156, C.I. Acid Orange 169 and C.I. Acid Orange 182.

The present invention further provides dichromatic or trichromatic dye mixtures comprising at least one yellow, orange or brown dye of the formula (1) as defined above, optionally in combination with further yellow dyestuffs and at least one red dye selected from C.I. Acid Red 1, C.I. Acid Red 2 and a dye of formula

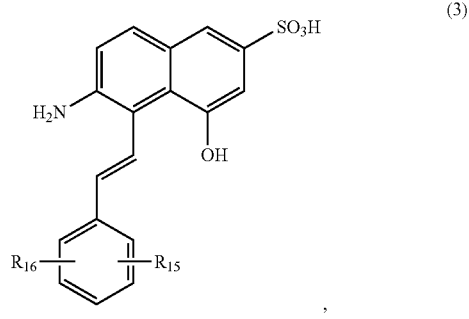

(3)

wherein $R_{15}$ and $R_{16}$ are each independently of the other hydrogen, $C_1$-$C_{12}$alkyl, $C_1$-$C_{12}$alkoxy, acetylamino, propionylamino, halogen, trifluoromethyl, phenylsulfonyl, phenylsulfonyloxy, phenylaminosulfonyl, 2,4-dimethylphenylaminosulfonyl or cyclohexylmethylaminosulfonyl, and/or at least one blue dye selected from C.I. Acid Blue 061 and a dye of formula

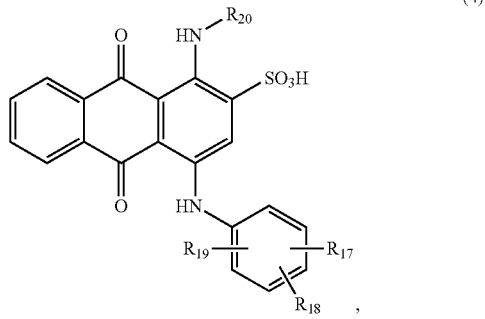

(4)

wherein $R_{17}$, $R_{18}$ and $R_{19}$ are each independently of the other hydrogen, $C_1$-$C_{12}$alkyl, $C_1$-$C_{12}$alkoxy, acetylamino, propionylamino, sulfo or 2-hydroxyethylaminosulfonyl, and $R_{20}$ is hydrogen or $C_1$-$C_{12}$alkyl.

Suitable red dyes which can be used in the dichromatic or trichromatic dye mixtures according to the invention are, for example, C.I. Acid Red 1, C.I. Acid Red 2, C.I. Acid Red 042, C.I. Acid Red 257, C.I. Acid Red 266, C.I. Acid Red 336, C.I. Acid Red 337, C.I. Acid Red 361 and C.I. Acid Red 426.

Suitable blue dyes which can be used in the dichromatic or trichromatic dye mixtures according to the invention are, for example, C.I. Acid Blue 040, C.I. Acid Blue 061, C.I. Acid Blue 062, C.I. Acid Blue 072, C.I. Acid Blue 258, C.I. Acid Blue 277, C.I. Acid Blue 277:1, C.I. Acid Blue 324, C.I. Acid Blue 340 and C.I. Acid Blue 343.

The dyes and dye mixtures according to the invention are suitable for dyeing or printing nitrogen-containing or hydroxyl-group-containing fibre materials, paper or leather, e.g. textile fibre materials of cellulose, silk and especially wool or synthetic polyamides.

Preference is given to the dyeing or printing of natural or synthetic polyamide fibre materials, especially synthetic polyamide fibre materials.

The process according to the invention and the dyes of formula (1) can be used in accordance with customary dyeing or printing processes. In addition to comprising water and the dyes, the dyeing liquors or printing pastes may comprise further additives, for example wetting agents, anti-foams, levelling agents or agents that influence the properties of the textile material, for example softeners, additives for flame-resistant finishes or dirt-, water- and oil-repellents and also water-softeners and especially natural or synthetic thickeners, e.g. alginates and cellulose ethers.

The amounts in which the individual dyes are used in the dye baths or printing pastes may vary within wide limits depending on the desired depth of colour; amounts of from 0.01 to 15% by weight, especially from 0.1 to 10% by weight, based on the goods to be dyed and the printing paste have proved advantageous.

Printing methods such as, for example, displacement printing or space dyeing are important in the case of carpet fabrics.

Preference is given to dyeing that is carried out especially according to the exhaust method and, in the case of carpet dyeing, it can also be carried out according to the continuous method.

Synthetic polyamide fibres are preferably dyed at a pH value of from 2 to 7, especially from 2.5 to 5.5, more especially from 2.5 to 4. The liquor ratio can be selected from within a wide range, e.g. from 1:5 to 1:50, preferably from 1:5 to 1:30. Dyeing is preferably carried out at a temperature of from 80 to 130° C., especially from 85 to 120° C.

In order to enhance the wet-fastness properties of dyed synthetic polyamide fibres, an aftertreatment can be carried out at a pH value of e.g. from 7 to 12, especially from 7 to 9, and a temperature of e.g. from 30 to 100° C., especially from 50 to 80° C., to remove any unfixed dye. In the case of intense hues, for example in the case of dyeings of very deep colour, especially on fibre blends, unfixed dye can advantageously be removed reductively, by adding to the alkaline aftertreatment bath a reducing agent, for example a hydrosulfite, e.g. sodium hydrosulfite. Dye that has been fixed in the fibre material is not attacked by the treatment. Advantageously, the amount of reducing agent added is e.g. from 0.1 to 6% by weight, especially from 0.5 to 5% by weight, based on the weight of the aftertreatment bath.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

I. PREPARATION EXAMPLES

Example I.1

A. 1$^{st}$ Coupling 20.1 g (0.10 mol) of dry 3-(2-hydroxyethylsulfonyl)aniline are suspended in 25% acetic acid under stirring at room temperature (RT). The beige suspension thus obtained is heated to 30° C. and 10 ml 32% hydrochloric acid are added thereto. The resulting clear solution is cooled to 2° C. and subsequently 2.5 ml of a 4N-NaNO₂ solution are added. The mixture is stirred during 20 min at 2-5° C. and afterwards the clear solution is dropped to an aqueous solution of 16.0 g 2,4-diaminobenzenesulfonic acid within 5 min. By addition of 30% NaOH in 30 min pH increases to 0.4 and temperature is raised to 55° C. After cooling down to RT, pH is adjusted to 0.4 by addition of 32% hydrochloric acid. Subsequently, the mixture is cooled to 16° C., when a beige solid precipitates which is separated by filtration.

B. 2nd Coupling 16.0 g (0.10 mol) 2-aminobenzoic acid methylester and 38 ml 32% HCl are added to 250 ml water. The resulting suspension is cooled to 2° C. and subsequently 2.5 ml of a 4N-NaNO₂ solution are added. After 5 min stirring at 0-5° C., the excess nitrite is destroyed by addition of 0.9 g of sulfamic acid. The solution so obtained is dropped within 10 min to the aqueous solution of the monoazo compound prepared in step A at 10° C., while the pH is held at 5.0 by addition of 30% NaOH. The solution is stirred over night and the resulting suspension is filtered through a suction filter, giving, after drying, an orange dye of the following structure:

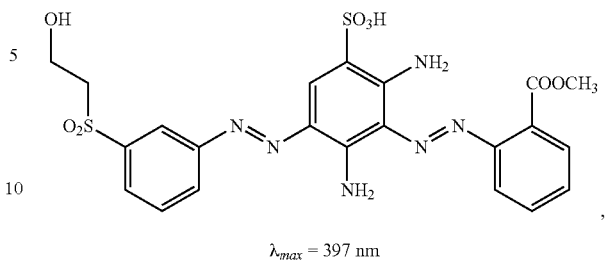

$\lambda_{max}$ = 397 nm ($\lambda_{max}$ = wavelength of the absorption maximum)

The compound of formula (101a) dyes PA in an orange shade having good allround fastness properties.

Examples I.2-I.93

In general accordance with the procedure described in Example I.1, the following dyes can be prepared, which dye PA with good allround fastness properties.

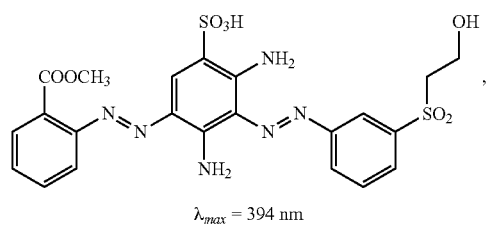

$\lambda_{max}$ = 394 nm

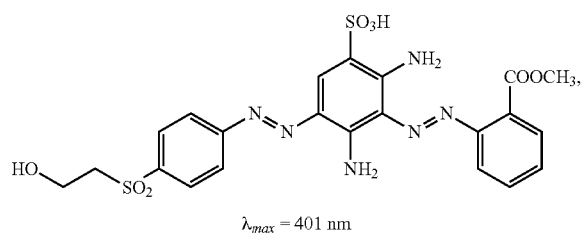

$\lambda_{max}$ = 401 nm

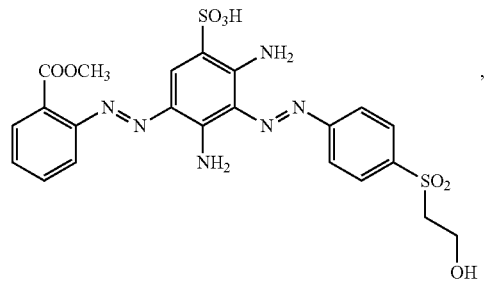

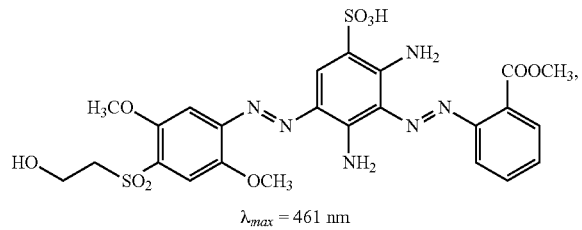

$\lambda_{max}$ = 461 nm

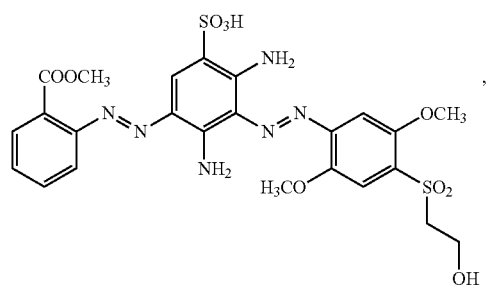

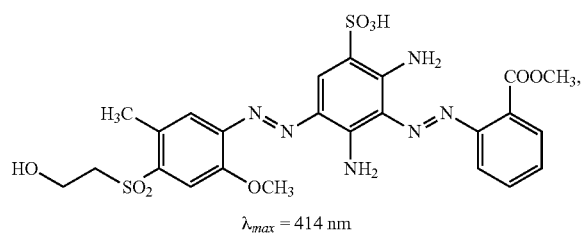

$\lambda_{max}$ = 414 nm

-continued
(104b)
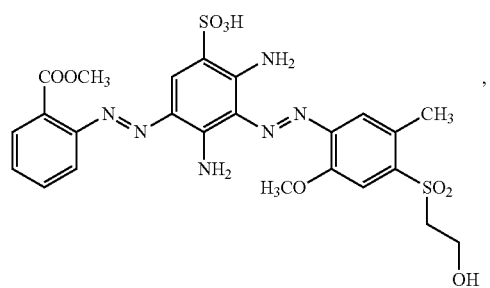
λ_max = 420 nm
(105a)
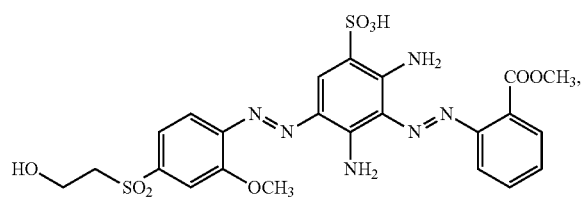
(105b)
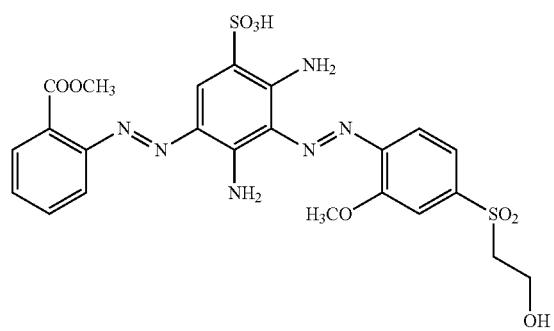
(106a)
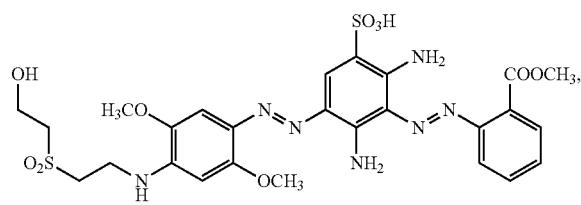
λ_max = 399 nm
(106b)
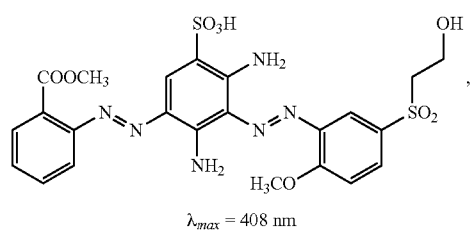
λ_max = 408 nm
(107a)
(107b)
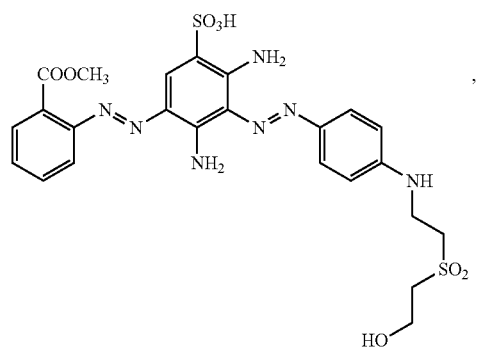
(108a)

-continued
(108b)
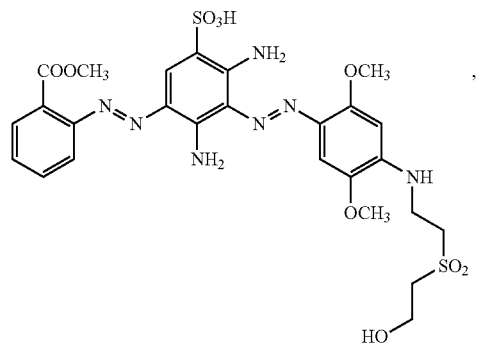
(109a)
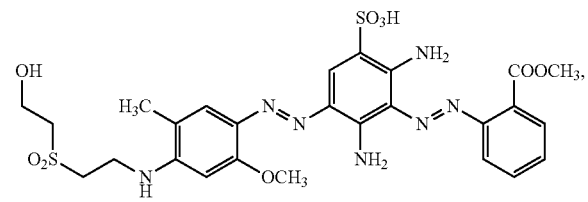
(109b)
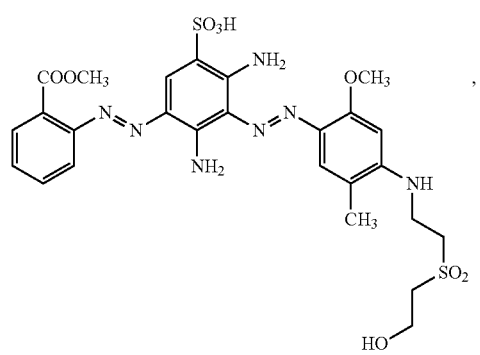
(110a)
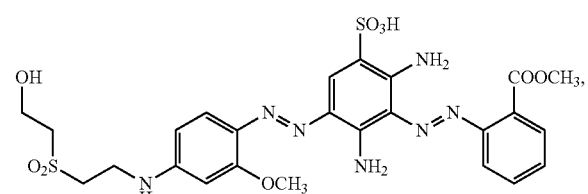
(110b)
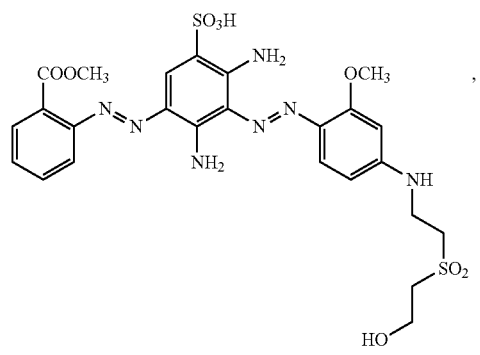
(111a)
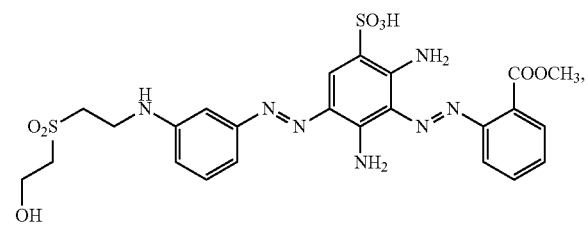
(111b)
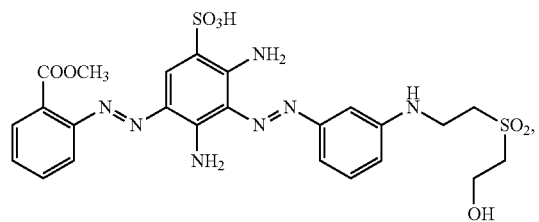
(112a)
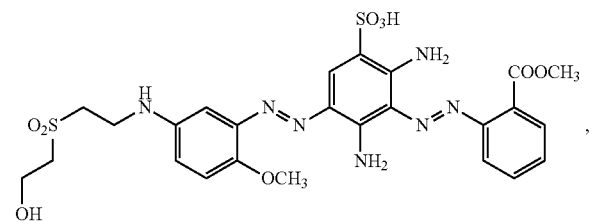
(112b)
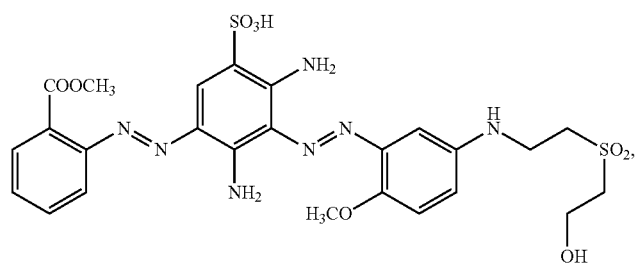

-continued
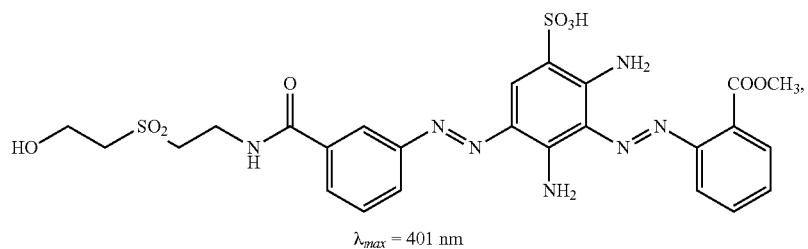
(113a)
λ_max = 401 nm
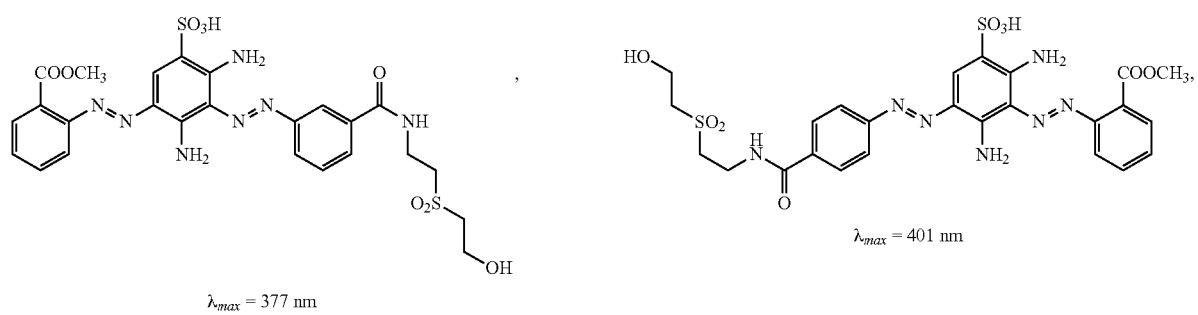
(113b) λ_max = 377 nm
(114a) λ_max = 401 nm
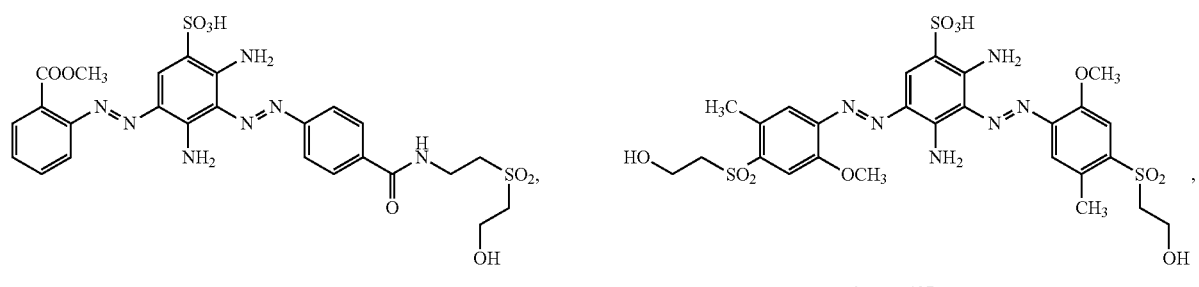
(114b)
(115) λ_max = 497 nm
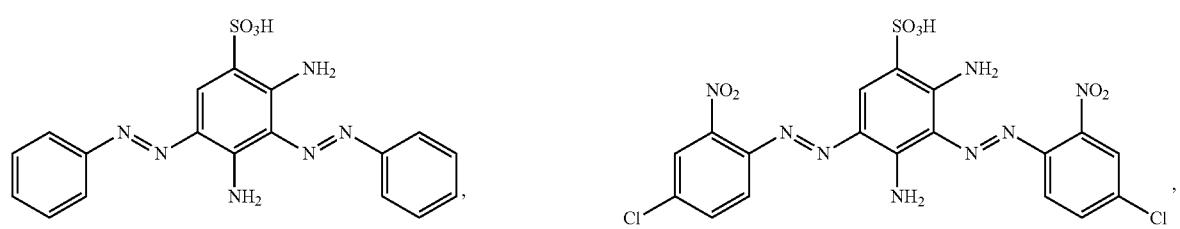
(116)
(117)
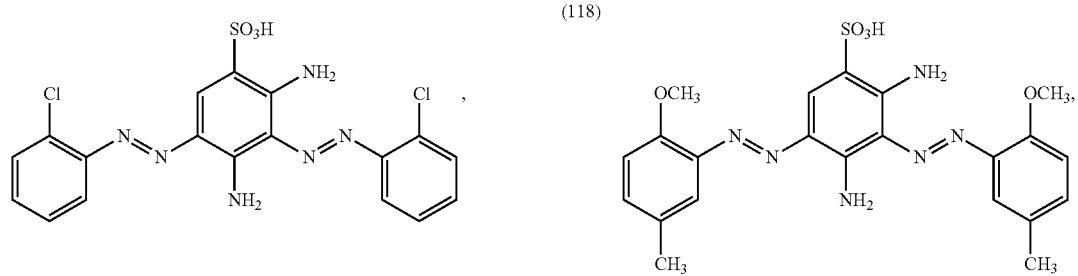
(118)
(119)

-continued
(120) 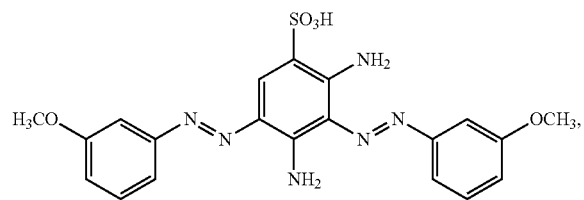
(121a) 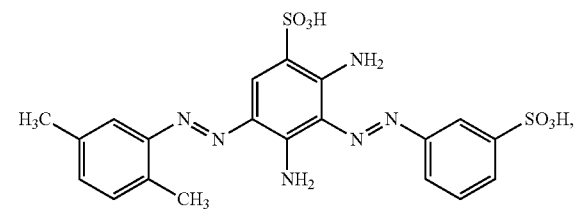
(121b) 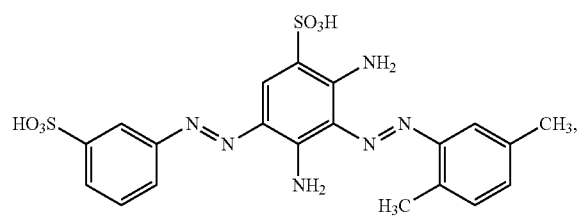
(122a) 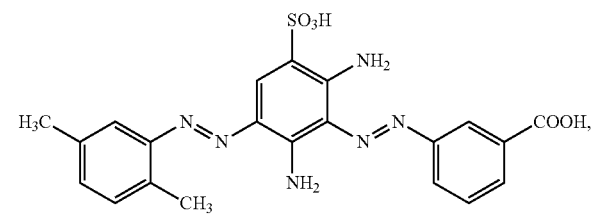
(122b) 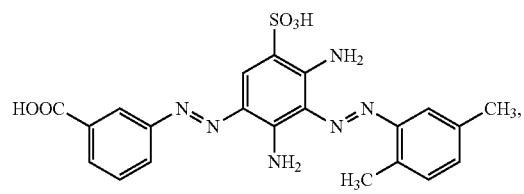
(123a) 
(123b) 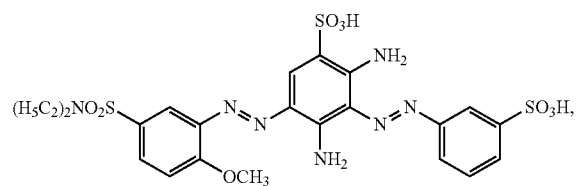
(124a) 
(124b) 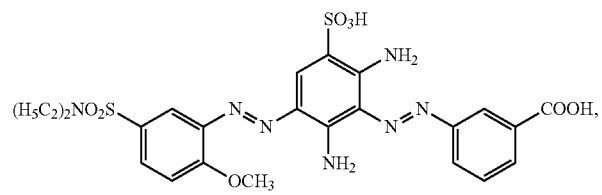
(125a) 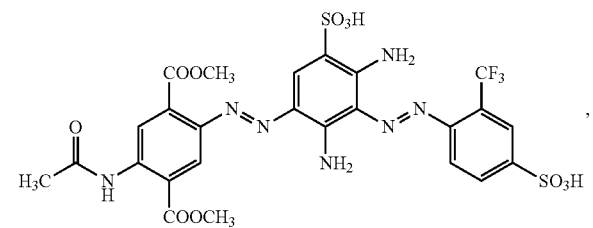
(125b) 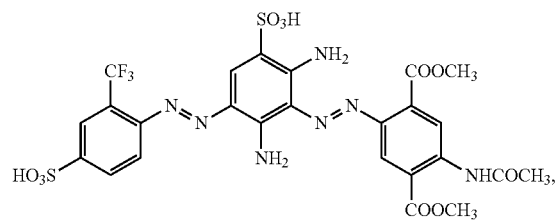
(126) 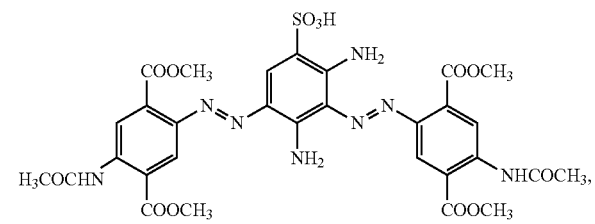

-continued
(127) 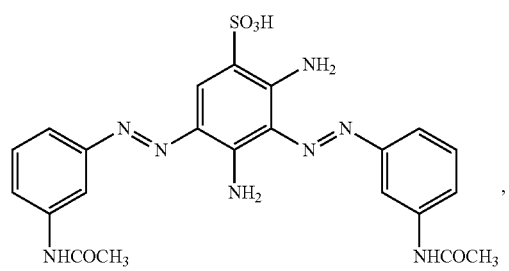
(128) 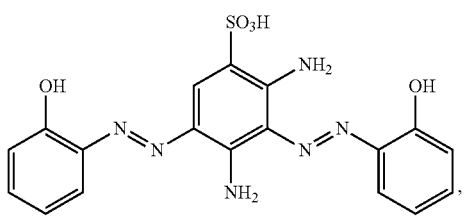
(129) 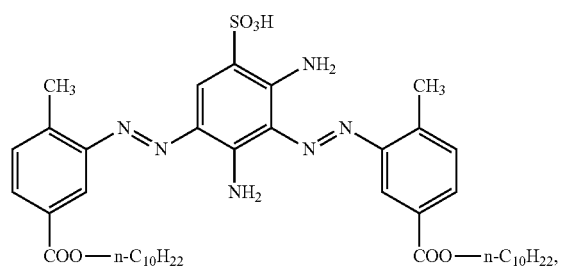
(130) 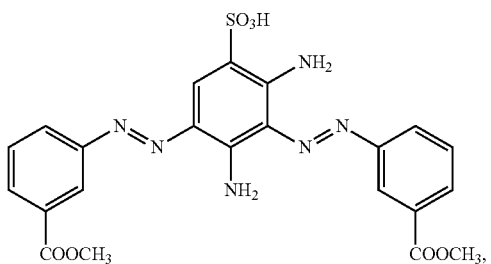
(131) 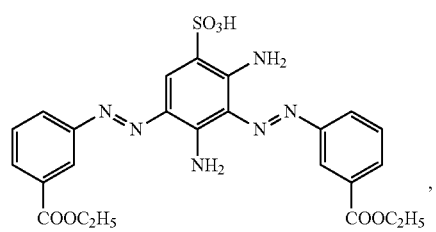
(132) 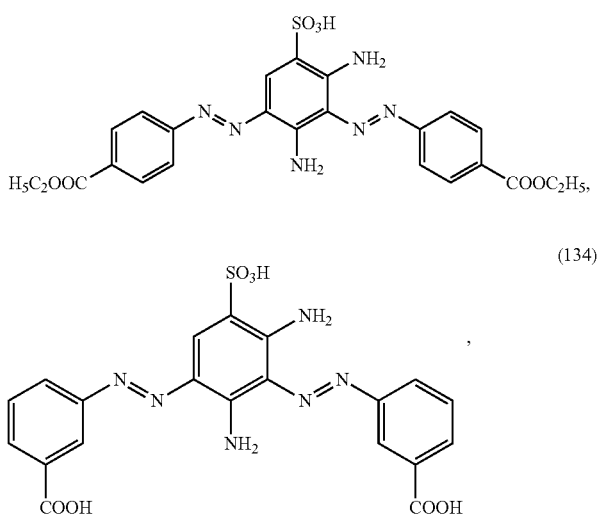
$\lambda_{max} = 393$ nm
(133) 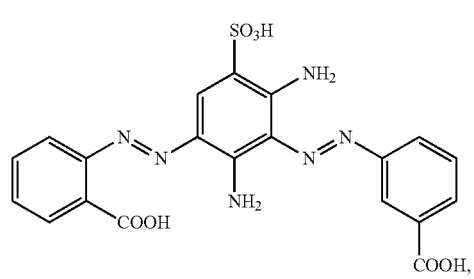
(135a) (135b)
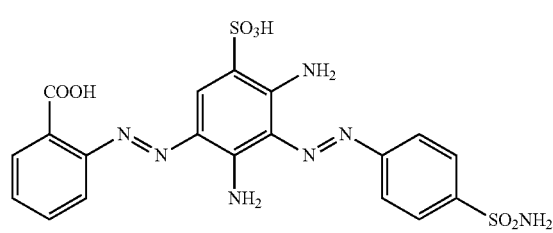
(136a) (136b)
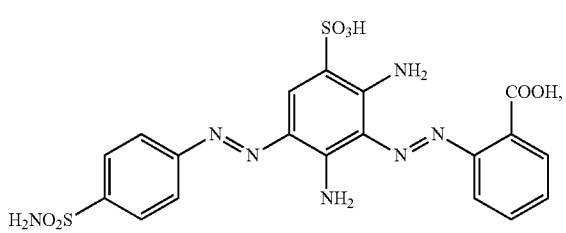

-continued
(137a)
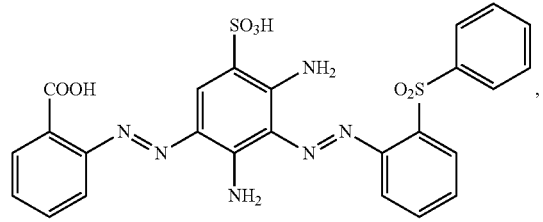
(137b)
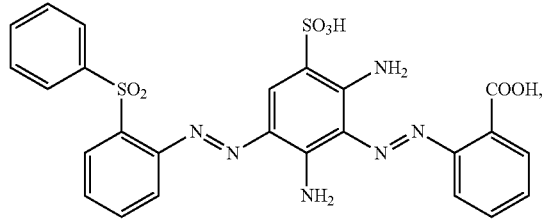
(138a)
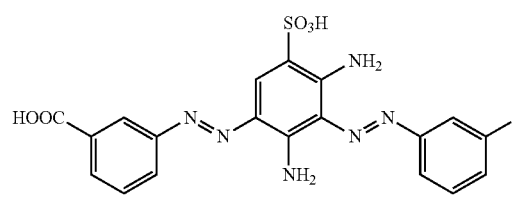
(138b)
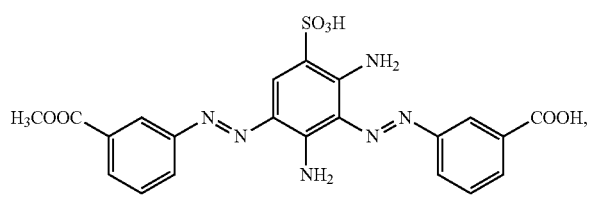
(139a)
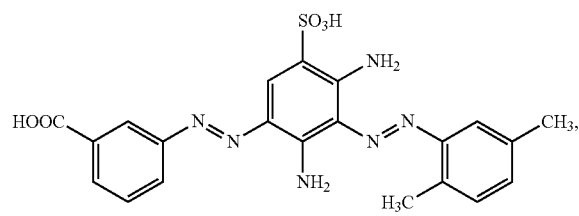
(139b)
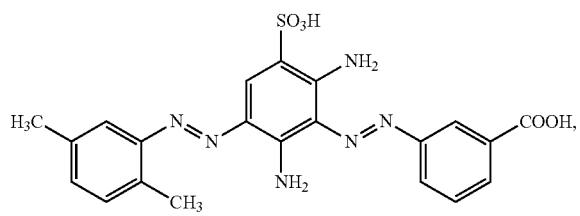
(140)
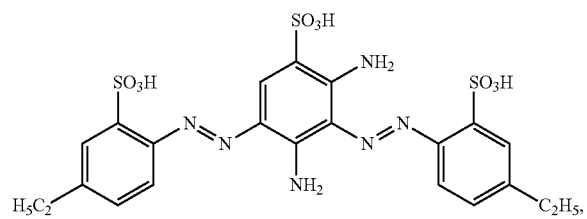
(141a)
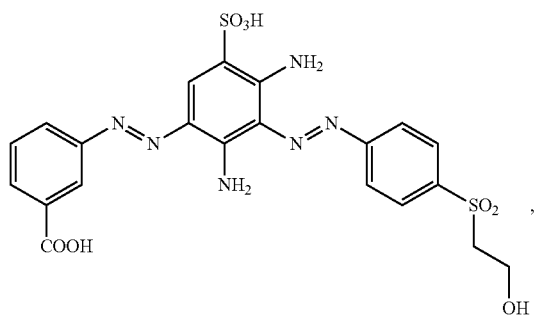
$\lambda_{max}$ = 398 nm
(141b)
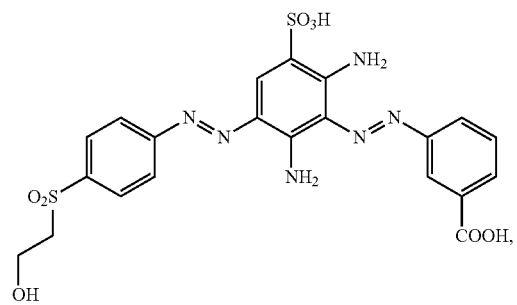
(142)
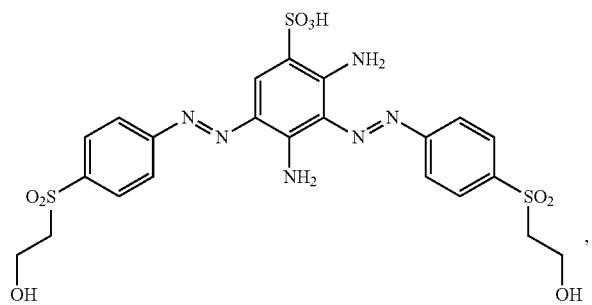
$\lambda_{max}$ = 407 nm -continued
(143a)
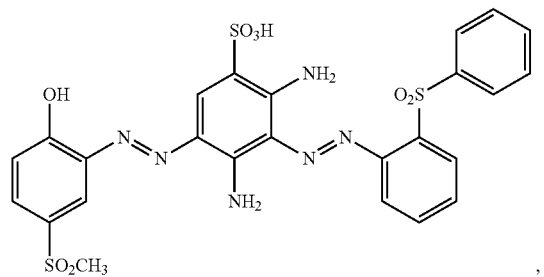
(143b)
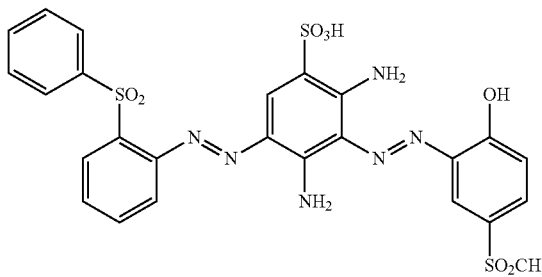
(144a)
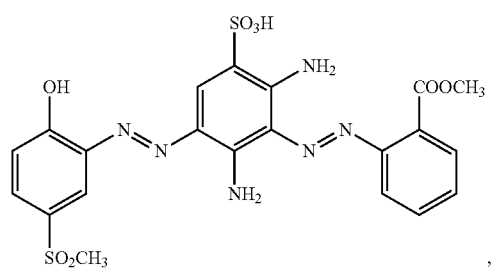
λ$_{max}$ = 400 nm
(144b)
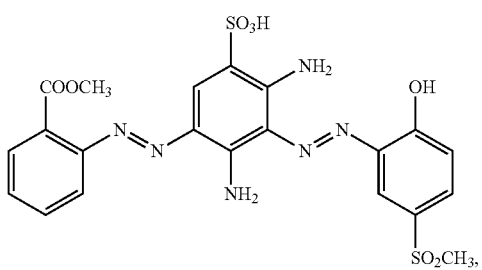
(145a)
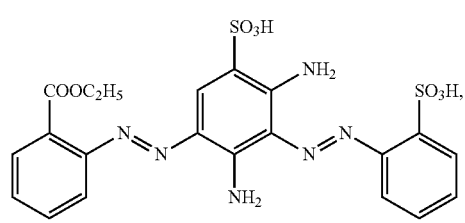
(145b)
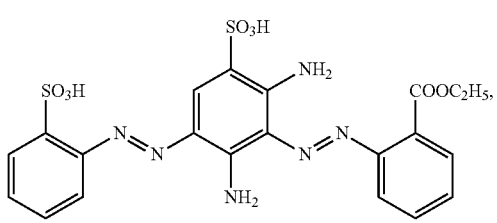
(146)
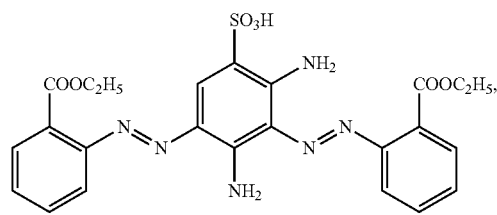
(147a)
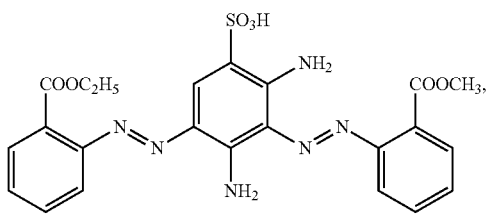
λ$_{max}$ = 482 nm
(147b)
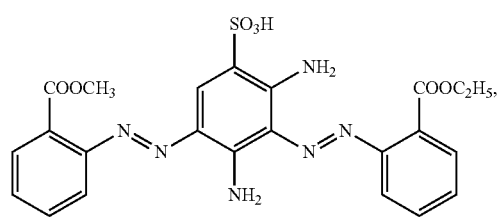
(148a)
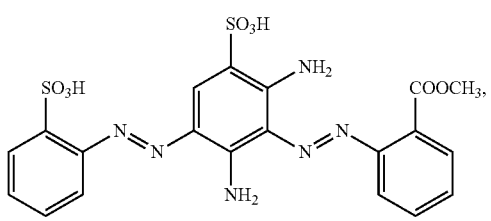
(148b)
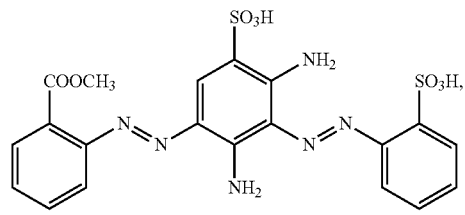
(149a)
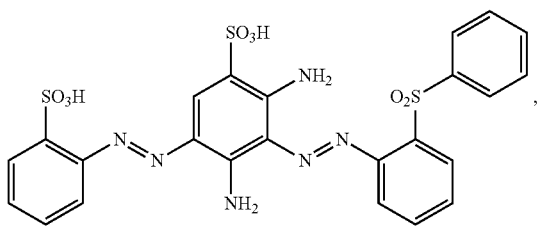
λ$_{max}$ = 407 nm -continued
(149b)
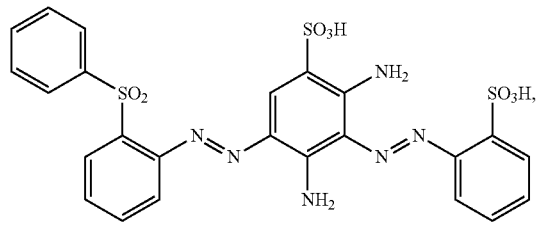
(150a)
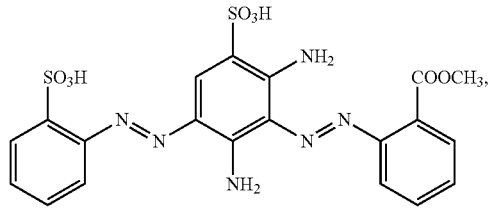
(150b)
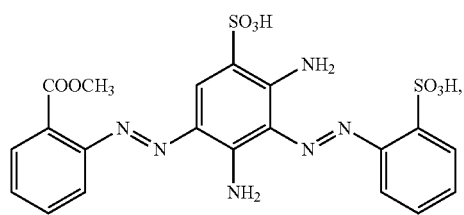
(151a)
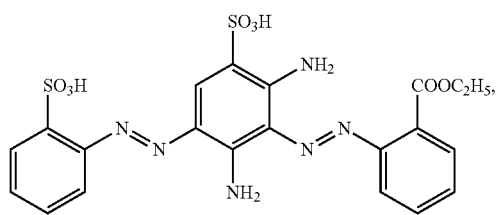
λ$_{max}$ = 398 nm
(151b)
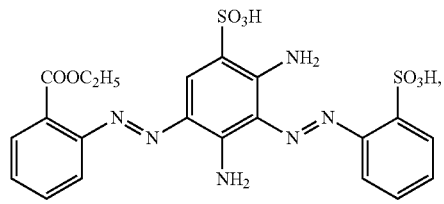
(152)
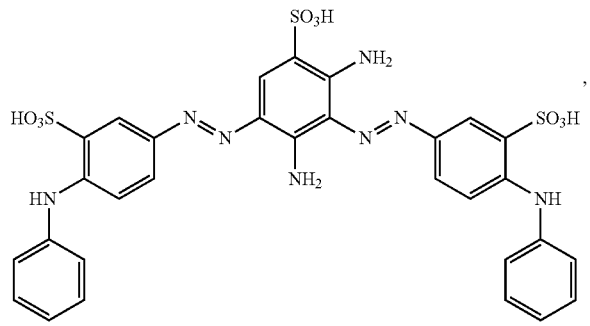
(153)
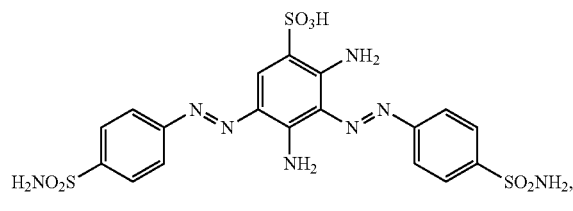
(154)
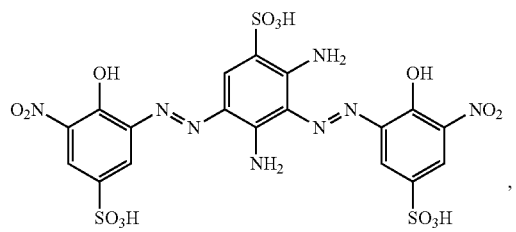
(155a)
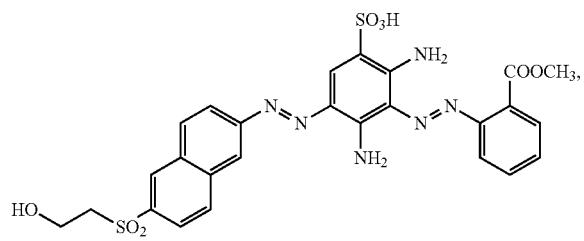
λ$_{max}$ = 402 nm
(155b)
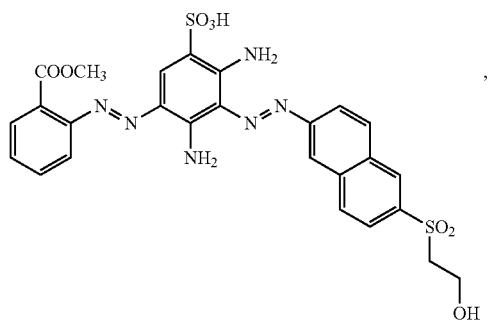

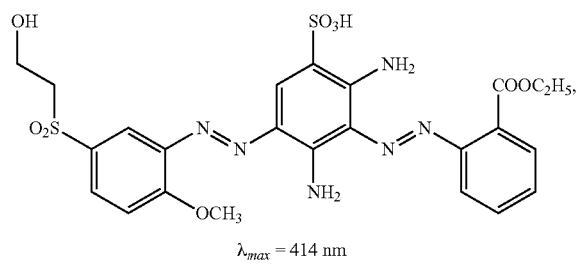

(156a) λ$_{max}$ = 414 nm

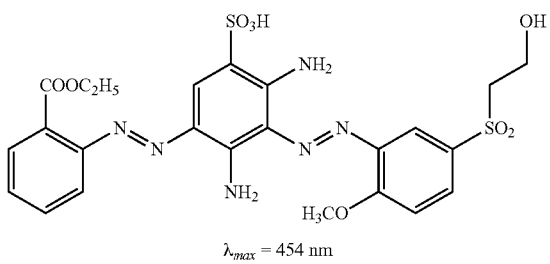

(156b) λ$_{max}$ = 454 nm

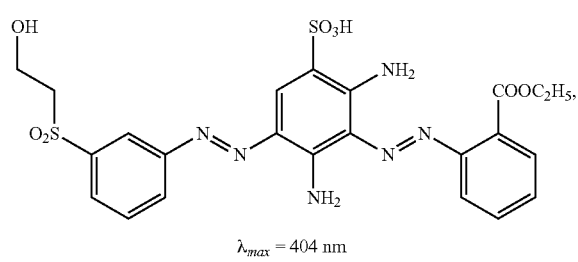

(157a) λ$_{max}$ = 404 nm

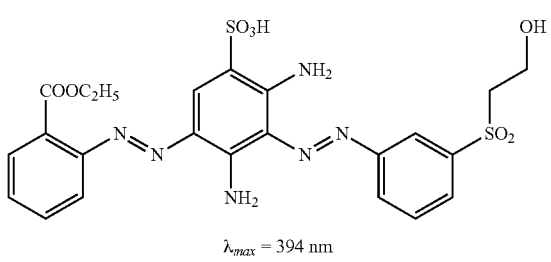

(157b) λ$_{max}$ = 394 nm

II. APPLICATION EXAMPLES

II. Compatibility Test 10 specimens of polyamide-6,6 fibre material (1 g Helanca jersey, 5-4112/13) are dyed in an aqueous liquor containing the orange dyestuff of formula (101a) or (106a), respectively, together with the blue dyestuff of formula (401).

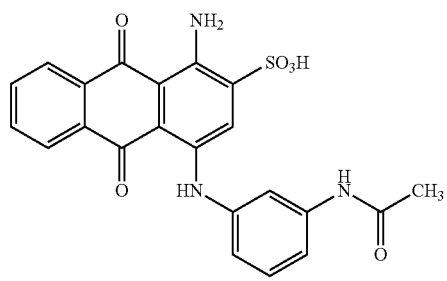

(401)

The dyestuffs of formulae (101a), (106a) and (401) are applied in amounts sufficient to achieve a colour strength of ½ SD Orange and ½ SD Blue.

The liquor is adjusted to a pH of 3 using 80% acetic acid and brought to boil in the course of 40 min and maintained at boiling temperature. Every 3 minutes one specimen is removed from the liquor, rinsed with cold deionised water (3 min), deionised water of 70° C. (3 min) and again with cold deionised water (3 min) and dried. The specimens are then compared with the target nuance. The exhaust rates of the dyes of formulae (101a) and (106a) are equal to that of the dye of formula (401). These results clearly show the good compatibility of the orange dyestuffs of formulae (101a) and (106a) with the blue dyestuff of formula (401).

Example II.1

Samples of a PA 6,6 carpet fabric are dyed in a high-temperature exhaust process at 98° C. in a dyebath containing 1% of one of the dyes (101a) or (106a). The resulting dyeings exhibit fastness values in respect of sublimation, washing and perspiration of ≥4.

What is claimed is:

1. A dye of formula

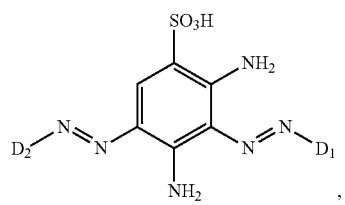

(1)

wherein $D_1$ and $D_2$ independently of one another represent each a radical of formula

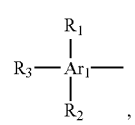

(2)

wherein $Ar_1$ represents the tetravalent radical of a carbocylic or heterocyclic aromatic compound, $R_1$ and $R_2$ are each independently of the other hydrogen, $C_1$-$C_{12}$ alkyl, $C_1$-$C_{12}$ alkoxy, halogen, —OH, —CN, —NO$_2$, —CF$_3$, —SO$_3$H, —NHCOR$_4$, —COOR$_5$, —CONR$_6$R$_7$, —SO$_2$NR$_8$R$_9$, —NR$_{10}$SO$_2$R$_{13}$—, —SO$_2$R$_{13}$— or —ZCH$_2$CH$_2$Q$_3$—, wherein Z is —O—, —SO$_2$—, —NR$_{12}$—, —CONH— or —NHCO—, $R_3$ is —COOCH$_3$ or —COOC$_2$H$_5$, Q represents —OH, $C_1$-$C_{12}$ alkyl, —SO$_2$R$_{13}$—, —NHR$_{14}$—, —OCH$_2$CH$_2$OH, —SO$_2$CH$_2$CH$_2$OH or —NHCH$_2$CH$_2$OH, $R_4$ is $C_1$-$C_{12}$ alkyl, $R_5$, $R_6$, $R_7$, $R_8$, $R_9$, $R_{10}$, $R_{12}$, $R_{13}$ and $R_{14}$ are each independently of the others hydrogen or $C_1$-$C_{12}$ alkyl, and
$R_{11}$ is $C_1$-$C_{12}$ alkyl,
with the proviso that at least one of the residues $D_1$ and $D_2$ is a radical of formula (2).

2. A dye of formula (1) according to claim 1, wherein $Ar_1$ represents the tetravalent radical of benzene.

3. A dye of formula (1) according to claim 1, wherein $R_1$ and $R_2$ are each independently of the other hydrogen, methyl or methoxy.

4. A dye of formula (1) according to claim 1 wherein one of the residues $D_1$ and $D_2$ is a radical of formulae (2a)-(2e)

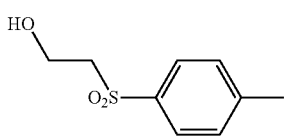 (2a)

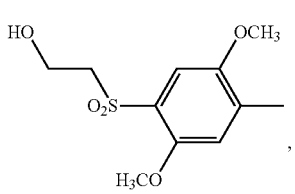 (2b)

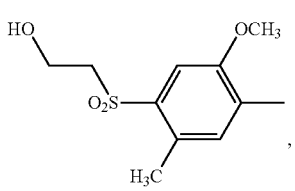 (2c)

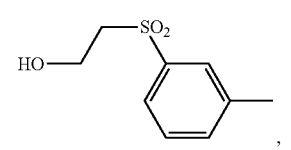 (2d)

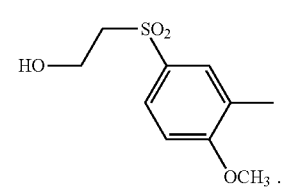 (2e)

5. A dye of formula (1) according to claim 1 wherein one of the residues $D_1$ and $D_2$ represents a radical of formula (2p) or (2q)

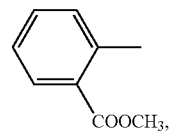 (2p)

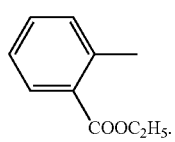 (2q)

6. A process for the preparation of a dye of formula (1) according to claim 1, wherein in a first step a diazo component of formula $D_1$-$NH_2$, wherein $D_1$ is as defined in claim 1, is diazotised and coupled to 2,4-diaminobenzenesulfonic acid and the thus obtained intermediate is reacted in a second step with a diazonium salt prepared by diazotation of a diazo component of formula $D_2$-$NH_2$, wherein $D_2$ is as defined in claim 1.

7. A dichromatic or trichromatic dye mixture comprising at least one yellow, orange or brown dye of the formula (1) as defined in claim 1 and at least one red dye selected from C.I. Acid Red 1, C.I. Acid Red 2, C.I. Acid Red 042, C.I. Acid Red 257, C.I. Acid Red 266, C.I. Acid Red 336, C.I. Acid Red 337, C.I. Acid Red 361 and C.I. Acid Red 426.

8. A dichromatic or trichromatic dye mixture comprising at least one yellow, orange or brown dye of the formula (1) as defined in claim 1 and at least one blue dye selected from C.I. Acid Blue 040, C.I. Acid Blue 061, C.I. Acid Blue 062, C.I. Acid Blue 072, C.I. Acid Blue 258, C.I. Acid Blue 277, C.I. Acid Blue 277:1, C.I. Acid Blue 324, C.I. Acid Blue 340 and C.I. Acid Blue 343. C.I. Acid Blue 040, C.I.

9. A method for dyeing or printing a hydroxyl group-containing or nitrogen-containing fibre material comprising applying the dye of formula (1) according to claim 1 to the fibre material.

10. A method for dyeing or printing natural or synthetic polyarnide-containing fibre material comprising applying the dye of formula (1) according to claim 1 to the fibre material.

* * * * *